US011131597B1

United States Patent
Oakes, III et al.

(10) Patent No.: US 11,131,597 B1
(45) Date of Patent: Sep. 28, 2021

(54) DETECTING AND REPAIRING DAMAGE TO BUILDING MATERIALS

(71) Applicant: United Services Automobile Association (USAA), San Antonio, TX (US)

(72) Inventors: Charles Lee Oakes, III, Boerne, TX (US); Bradly Jay Billman, Celina, TX (US); Gianna Weingarden, Richardson, TX (US); Nicole Ferretti, Frisco, TX (US); Cory Matheson, Celina, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 805 days.

(21) Appl. No.: 15/386,600

(22) Filed: Dec. 21, 2016

Related U.S. Application Data

(60) Provisional application No. 62/270,364, filed on Dec. 21, 2015, provisional application No. 62/327,569, filed on Apr. 26, 2016.

(51) Int. Cl.
| | | |
|---|---|---|
| *G01M 5/00* | (2006.01) | |
| *G08B 5/22* | (2006.01) | |
| *E04G 23/02* | (2006.01) | |
| *G06T 7/00* | (2017.01) | |
| *G06T 17/00* | (2006.01) | |
| *G06Q 10/00* | (2012.01) | |
| *G06Q 50/16* | (2012.01) | |
| *H04L 29/08* | (2006.01) | |
| *G06T 7/70* | (2017.01) | |

(52) U.S. Cl.
CPC ............ *G01M 5/0033* (2013.01); *E04G 23/02* (2013.01); *E04G 23/0281* (2013.01); *G01M 5/0083* (2013.01); *G06Q 10/20* (2013.01); *G06Q 50/163* (2013.01); *G06T 7/0004* (2013.01); *G06T 7/70* (2017.01); *G06T 17/00* (2013.01); *G08B 5/22* (2013.01); *G06T 2207/10032* (2013.01); *G06T 2207/30108* (2013.01); *H04L 67/12* (2013.01)

(58) Field of Classification Search
CPC ... G01M 5/0033; G01M 5/0083; E04G 23/02; E04G 23/0281; G06T 2207/30108; G06Q 50/163; G08B 5/22
See application file for complete search history.

(56) References Cited

U.S. PATENT DOCUMENTS

| | | | | |
|---|---|---|---|---|
| 5,742,335 A * | 4/1998 | Cannon | ................ | G01M 11/081 348/135 |
| 6,104,298 A * | 8/2000 | Flanders | ................. | E04D 13/00 340/539.1 |
| 9,152,863 B1 * | 10/2015 | Grant | ..................... | G06Q 40/08 |
| 9,928,553 B1 * | 3/2018 | Harvey | ............. | G06K 9/00637 |

(Continued)

*Primary Examiner* — Catherine T. Rastovski
*Assistant Examiner* — Liam R Casey
(74) *Attorney, Agent, or Firm* — Fish & Richardson P.C.

(57) ABSTRACT

Methods, systems, and apparatus, including computer programs encoded on a computer storage medium for receiving an indication of damage to a building from a sensor network associated with the building, where the sensor network is responsive to damage to the building. Determining a location and an extent of the damage to the building based on the indication of damage. Automatically coordinating a repair for the damage in response to determining the location and the extent of the damage.

20 Claims, 8 Drawing Sheets

(56) References Cited

U.S. PATENT DOCUMENTS

| | | | | |
|---|---|---|---|---|
| 2005/0259715 A1* | 11/2005 | Lee | ........................ | G01N 25/72 374/124 |
| 2007/0265790 A1* | 11/2007 | Sealing | ............... | G01M 5/0033 702/33 |
| 2009/0216552 A1* | 8/2009 | Watrous | ................. | G06Q 50/08 705/305 |
| 2009/0265193 A1* | 10/2009 | Collins | .............. | G06Q 30/0185 705/4 |
| 2010/0094566 A1* | 4/2010 | Grant | ................. | G01M 5/0016 702/38 |
| 2010/0119704 A1* | 5/2010 | Hemmelgarn | ...... | B29C 35/0272 427/140 |
| 2011/0102588 A1* | 5/2011 | Trundle | ................. | H04N 7/188 348/143 |
| 2012/0188078 A1* | 7/2012 | Soles | ................... | G08B 13/126 340/540 |
| 2013/0110462 A1* | 5/2013 | Lovitt | ................... | H04L 67/125 702/179 |
| 2013/0262029 A1* | 10/2013 | Pershing | ................ | G06Q 10/06 702/156 |
| 2013/0264074 A1* | 10/2013 | Lewis | .................... | A62C 37/36 169/46 |
| 2014/0270492 A1* | 9/2014 | Christopulos | .......... | G06K 9/627 382/159 |
| 2014/0279593 A1* | 9/2014 | Pershing | .............. | G06Q 50/163 705/314 |
| 2014/0334689 A1* | 11/2014 | Butler | ..................... | G06T 7/001 382/108 |
| 2015/0093047 A1* | 4/2015 | Battcher | ................ | G06F 16/532 382/305 |
| 2015/0186953 A1* | 7/2015 | Gross | ................... | G06F 16/5838 705/14.58 |
| 2015/0302529 A1* | 10/2015 | Jagannathan | .......... | G06Q 40/08 705/4 |
| 2015/0332407 A1* | 11/2015 | Wilson, II | .............. | G06Q 40/08 705/4 |
| 2015/0356686 A1* | 12/2015 | Cook | ..................... | G06Q 40/08 705/4 |
| 2016/0178463 A1* | 6/2016 | Georgeson | .............. | G01P 15/06 116/201 |
| 2017/0055131 A1* | 2/2017 | Kong | ................. | H04W 40/246 |

* cited by examiner

DETECTING AND REPAIRING DAMAGE TO BUILDING MATERIALS

CROSS-REFERENCE TO RELATED APPLICATIONS

This application claims the benefit of the filing date of U.S. Provisional Application No. 62/270,364, filed on Dec. 21, 2015, and U.S. Provisional Application No. 62/327,569, filed on Apr. 26, 2016. The contents of U.S. Application Nos. 62/270,364 and 62/327,569 are incorporated herein by reference in their entirety.

BACKGROUND

Damage to buildings can be caused by catastrophic events such as hail storms, wind storms, hurricanes, and by environmental situations such as high heat and extreme cold conditions, falling branches. In many cases, minor damage to a building's roof or walls may go unnoticed and unrepaired. More extensive damage often occurs over time as the minor damage is subjected to environmental elements such as water, ice, wind, and heat stress. A minor crack in a wall or small leak in a roof, for example, can become a major structural hazard due to rot or biological hazard due to mold over time.

SUMMARY

This specification relates to detecting damage to building materials and preventing additional damage caused by the exposure of damaged building to environmental elements.

Implementations of the present disclosure generally detect damage to materials in a building (e.g., a roof or walls), and, in some cases, automatically repair damage. More particularly, implementations of the present disclosure are directed to a sensor network and corresponding building monitoring system that can detect damage to building materials and coordinate timely repair of the damage. For example, a sensor network can be incorporated into a roof of a building. If the roof is damaged, for example, by a tree branch falling on the roof, individual sensors in the network can detect the damage caused by the branch, such as a crack or hole. Such damage may normally pass unnoticed until water begins dripping from the ceiling during a heavy rain storm. However, at that point the damage has extended from the roof to the ceiling, walls, and insulation. The building monitoring system can determine the location and extent of the damage using data or signals received from sensors in the sensor network, and alert a user (e.g., a homeowner or a building manager) to the damage before additional damage occurs. In some examples, the building monitoring system can alert the user to the damage, for instance, through a control panel in the building, a software application on the user's mobile computing device, or a notification from a third party monitoring system (e.g., an insurance company, or home security company).

In general, innovative aspects of the subject matter described in this specification can be embodied in methods that include actions of receiving an indication of damage to a building from a sensor network associated with the building, where the sensor network is responsive to damage to the building. Determining a location and an extent of the damage to the building based on the indication of damage. Automatically coordinating a repair for the damage in response to determining the location and the extent of the damage. Other implementations of this aspect include corresponding systems, apparatus, and computer programs, configured to perform the actions of the methods, encoded on computer storage devices.

These and other implementations can each optionally include one or more of the following features. The indication can include data indicating that the damage has been at least partially repaired by a self-healing substance in a material of the building. Determining the location and the extent of the damage can include determining a number of sensors from the sensor network that have been activated due to the damage. Coordinating the repair for the damage can include causing the sensor network to activate a self-healing substance to, at least partially, repair the damage.

Some implementations can include sending an alert indicating the location and extent of the damage to the building for display on a user interface device. The user interface device can be a control panel for the sensor network associated with the building. The user interface device can be a mobile computing device.

Coordinating the repair for the damage can include identifying building repair services to repair the damage, and sending an alert indicating the location and extent of the damage, and contact information for the identified building repair services for display on a user interface device. Coordinating the repair for the damage can include automatically opening an insurance claim for repairing the damage based on the determined location and extent of the damage.

In another general aspect, implementations of the present disclosure relate to a building monitoring system. The building monitoring system includes a sensor network associated with a building and being responsive to damage to the building, at least one processor in communication with the sensor network, a data store coupled to the at least one processor. The data store includes instructions which, when executed by the at least one processor, causes the at least one processor to perform operations of receiving an indication of damage to the building from the sensor network, determining a location and an extent of the damage to the building based on the indication, and automatically coordinating a repair for the damage in response to determining the location and the extent of the damage.

This and other implementations can each optionally include one or more of the following features. Sensors in the sensor network can be attached to a building material of the building. The sensors can include an open circuit and a conductive material, and the sensor can be configured such that upon damage to the building material the conductive material closes the open circuit thereby causing a signal to be sent to the at least one processor.

The sensor network can include a network of imaging devices. The imaging devices can be configured to obtain a plurality of images of a building material in the building, and the operations can include generating a three dimensional image of the building material in the building using the plurality of images, and detecting damage based on monitoring for changes in a shape of the building material as indicated by the three dimensional image of the building material.

Sensors in the sensor network can be attached to a building material of the building, and the sensors can include first and second conductive layers separated by an electrically insulating layer, where the first and second conductive layers forming an open circuit. The conductive layers and the electrically insulating layer can be configured such that upon an impact to the building material one of the first or second conductive layer deforms to contact the other of the first or second conductive thereby closing the open circuit and causing a signal to be sent to the at least one processor.

In another general aspect, innovative features of the subject matter described in this specification can be embodied in methods that include actions of receiving an indication of damage to a building from a sensor network associated with the building, where the sensor network is responsive to damage to the building. Automatically coordinating an overhead inspection of the building to obtain an image of the building in response to receiving the indication of damage. Determining a location and an extent of the damage to the building based on the image. Automatically coordinating a repair for the damage in response to determining the location and the extent of the damage. Other implementations of this aspect include corresponding systems, apparatus, and computer programs, configured to perform the actions of the methods, encoded on computer storage devices. These and other implementations can each optionally include one or more of the following features.

In some implementations, automatically coordinating the overhead inspection can include coordinating a drone flight over the building and receiving the image from a drone. In some implementations, automatically coordinating the overhead inspection can include coordinating with a satellite control center to obtain satellite images of the building and receiving the image from a satellite.

Some implementations can include receiving, from the sensor network, data indicating that the damage has been at least partially repaired by a self-healing substance in a material of the building, and determining, from the image, a quality of the at least partial repair by the self-healing substance.

In some implementations, automatically coordinating the repair for the damage can include causing the sensor network to activate a self-healing substance to, at least partially, repair the damage.

Some implementations can include sending, for display on a user interface device, an alert indicating the location and extent of the damage to the building, and where the alert includes the image. In some implementations, the user interface device is a control panel for the sensor network associated with the building. In some implementations, the user interface device is a mobile computing device.

In some implementations, automatically coordinating the repair for the damage can include identifying building repair services to repair the damage and sending, for display on a user device, an alert indicating the location and extent of the damage and contact information for the identified building repair services.

In some implementations, automatically coordinating the repair for the damage can include automatically opening an insurance claim for repairing the damage based on the determined location and extent of the damage.

In another general aspect, innovative features of the subject matter described in this specification can be embodied in methods that include actions of detecting an indication of a power loss at a building monitoring system associated with a building, where the building monitoring system includes a sensor network that is responsive to damage to the building. Automatically causing a wireless signal to be sent to the sensor network by a device that is external to the building monitoring system in response to receiving the indication. Receiving, from the device, a response to the signal from a sensor in the sensor network, where the response indicates whether the building is damaged. Selectively coordinating a repair for the building based on the response. Other implementations of this aspect include corresponding systems, apparatus, and computer programs, configured to perform the actions of the methods, encoded on computer storage devices. These and other implementations can each optionally include one or more of the following features.

In some implementations, the sensor network includes a signal receiver that uses energy from the signal to supply temporary power to the sensor and to transmit the response. In some implementations, the device is a drone. In some implementations, the device is a second building monitoring system associated with a second building.

In some implementations, the response includes data indicating that the damage has been at least partially repaired by a self-healing substance in a material of the building.

Some implementations include determining a location and an extent of the damage to the building based on the response.

In some implementations, determining the location and the extent of the damage includes determining a number of sensors from the sensor network that have been activated due to the damage.

In some implementations, automatically coordinating the repair for the damage includes causing a second wireless signal to be sent to the sensor network by the device, where the second wireless signal causes the sensor network to activate a self-healing substance to, at least partially, repair the damage.

Some implementations include sending, for display on a user interface device, an alert indicating a location and extent of the damage to the building. In some implementations, the user interface device is a mobile computing device.

In some implementations, automatically coordinating the repair for the damage includes identifying building repair services to repair the damage, and sending, for display on a user device, an alert indicating a location and extent of the damage and contact information for the identified building repair services.

In some implementations, automatically coordinating the repair for the damage includes automatically opening an insurance claim for repairing the damage.

Particular implementations of the subject matter described in this specification can be implemented so as to realize one or more of the following advantages. Implementations may provide early detection of minor damage to buildings, thereby preventing unnecessary additional damage due to delayed repairs and exposure to the elements. Implementations may automatically make temporary repairs to damaged building materials preventing further damage caused by exposure of internal structures to the elements. Implementations may save users time by automatically coordinating repairs for damaged building materials. Implementations may autonomously inspect building damage by coordinating drone flights or satellite imagery of the building. Implementations may permit external queries of building sensor networks to detect damage even when power is lost to a building monitoring system. The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
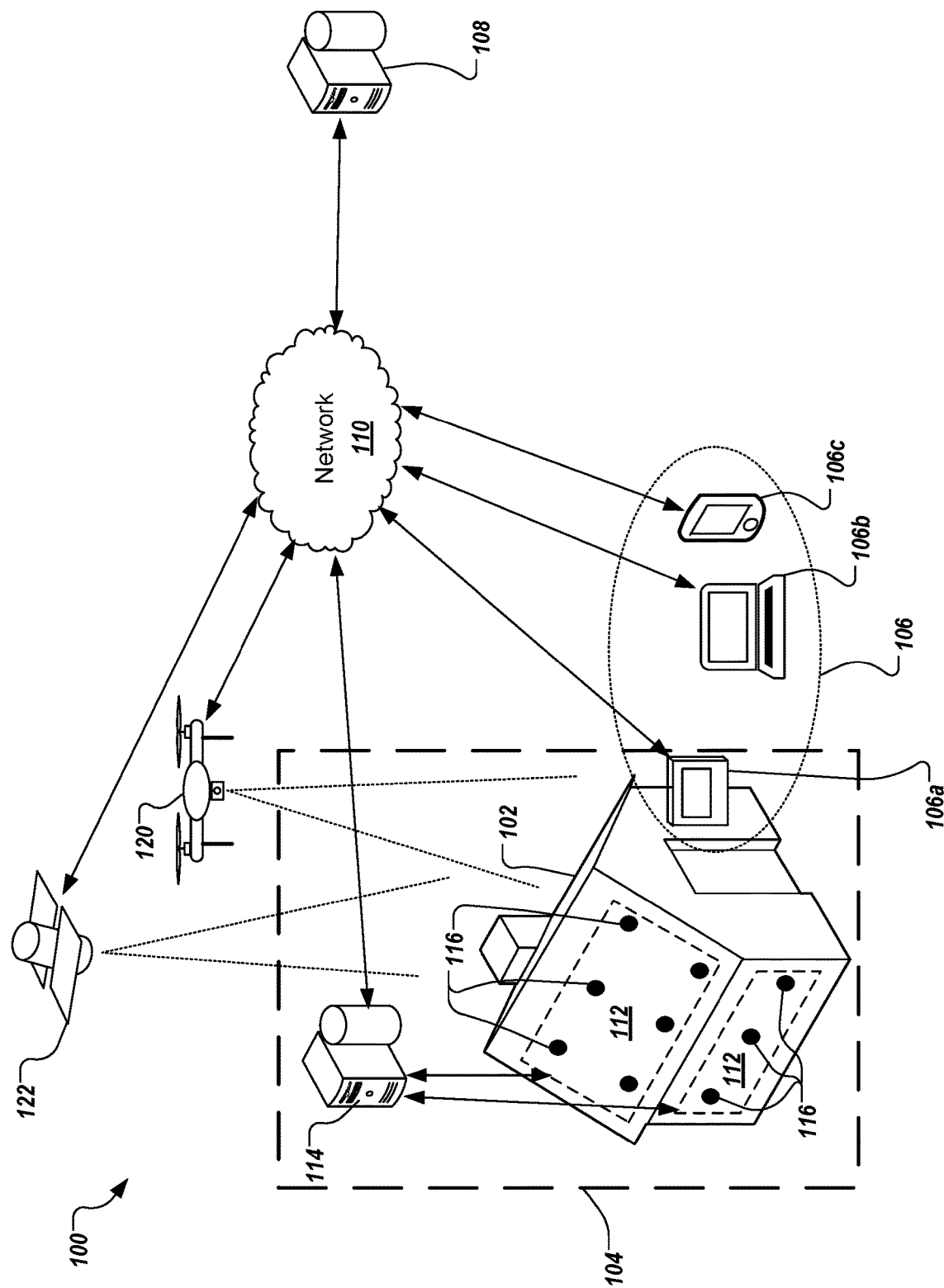
FIGS. 1A and 1B depict an example system in accordance with implementations of the present disclosure.

Implementations of the present disclosure generally detect damage to materials in a building (e.g., roof or wall materials such as plywood, shingles, sheet rock, siding, etc.). In some implementations, damage can be automatically repaired. More particularly, implementations of the present disclosure are directed to a sensor network and corresponding building monitoring system that can detect damage to building materials and coordinate timely repair of the damage. For example, a sensor network can be incorporated into a roof of a building. If the roof is damaged, for example, by a tree branch falling on the roof, individual sensors in the network can detect the damage caused by the branch, such as a crack or hole. Such damage may normally pass unnoticed until water begins dripping from the ceiling during a heavy rain storm. However, at that point, the damage has extended from the roof to the ceiling, walls, and insulation. The building monitoring system can determine the location and extent of the damage using data or signals received from sensors in the sensor network, and alert a user (e.g., a homeowner or a building manager) to the damage before additional damage occurs. In some examples, the building monitoring system can alert the user to the damage, for instance, through a control panel in the building, a software application on the user's mobile computing device, or a notification from a third party monitoring system (e.g., an insurance company, or home security company).

In some implementations, the building monitoring system can coordinate repair of the damage. For example, the building monitoring system can be integrated with a homeowner's account at an insurance company. The building monitoring system can send data describing the damage to a computing system at the insurance company to open an insurance claim for the homeowner. In some examples, the building monitoring system can request repair quotes from contractors and provide the homeowner with recommended repairs services for repairing the damage.

In some implementations, the sensor network can be configured with the ability to make automatic repairs to the damage. For example, the sensors or building materials can include self-healing materials. Example self-healing materials can include, without limitation, self-healing polymers, clay beads, or microcapsules. The self-healing material can, for example, fill a crack or hole in a building material and provide at least a temporary repair to prevent further damage until a permanent repair can be made. In some examples, the self-healing materials can be activated by the damage itself (e.g., an impact or moisture).

In some examples, the self-healing materials can be activated or applied by repair mechanisms included in the sensor network. In some implementations, the computing system can determine the strength or sufficiency of the repair from data or signals received from the sensor network and use such information to schedule a permanent repair. For example, if the repair is determined to be weak the building monitoring system can weigh repair timing more highly than repair cost when coordinating repairs with contractors or when submitting an insurance claim.

In some implementations, the computing system can access weather information (e.g., local weather information) from sources such as the National Oceanic and Atmospheric Administration (NOAA) or local weather stations. The weather information can be incorporated as a factor in scheduling repairs. For example, if a major storm is predicted, the computing system can prioritize scheduling the repair for dates prior to the storm.

In some implementations, the building monitoring system or computing system can coordinate autonomous inspections of damage to a building. For example, the computing system can coordinate aerial inspections of a building to obtain high resolution images of the building. In some examples, the computing system can further evaluate the damage to the building by analyzing the images. In some implementations, the computing system can coordinate a drone flight over the building. The drone can capture images of the building and transmit the images to the computing system. In some implementations, the computing system can coordinate high resolution satellite imagery to be taken of the building and transmitted to the computing system.

In some implementations, the computing system can monitor the operational status of the building monitoring system. For example, the building monitoring system can transmit a liveness signal to the computing system to verify proper operations of the building monitoring system. The computing system may detect a problem with the building monitoring system if it does not receive the liveness signal for a predefined period of time. For example, the building monitoring system may be damaged or may have lost power. In some implementations, the computing system can coordinate with an external device to send a wireless signal to the building monitoring system and remotely query the sensor network of the building monitoring system. For example, the sensor network can include a transceiver that allows the sensor network to receive the signal, query the sensors for damage, and send a response to the external device. In some implementations, when the building monitoring system is damaged or loses power, the sensor network may operate in a passive state, in which, energy from the signal is used to provide temporary power to the sensor network. The energy from the signal can provide sufficient power for the sensor network to respond to the signal. In some implementations, the sensor network can include a backup power source (e.g., a battery) that provides sufficient power to respond to a signal from an external device.

Figure 1B:
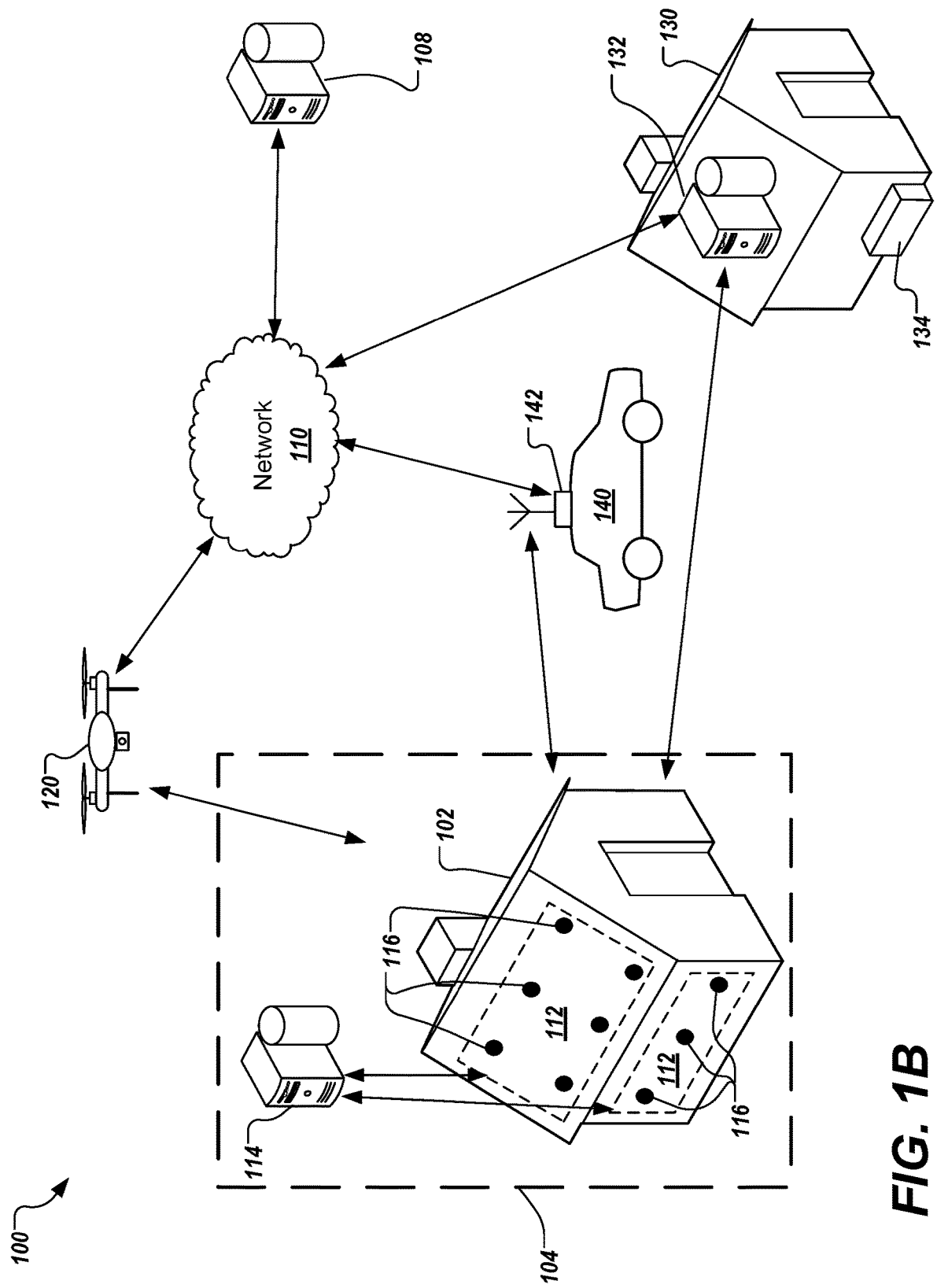

FIGS. 1A and 1B depict an example system 100 that can execute implementations of the present disclosure. The example system 100 includes a building 102 with a building monitoring system 104 in communication with one or more user interface devices 106, and one or more third party systems 108. The building monitoring system 104 is in communication with the user interface devices 106, and third party systems 108 through network 110. The network 110 can include a large network or combination of networks, such as a local area network (LAN), wide area network (WAN), the Internet, a cellular network, a satellite network, one or more wireless access points, or any appropriate combination thereof connecting any number of mobile clients, fixed clients, and servers.

Referring first to FIG. 1A, the building monitoring system 104 includes a network 112 of building sensors 116 in communication with a monitoring hub 114. The sensor network 112 can be integrated with or attached to one or more building materials of the building 102. For example, sensors 116 can be built into building material used to construct the building 102 or attached to the building material of the building 102 during or after construction. The sensors 116 can be configured to monitor for damage in the roof, interior or exterior walls, ceilings, or other appropriate portions of the building 102. The monitoring hub 114 includes one or more internal or external storage components storing data and programs such as an operating system and one or more application programs. Furthermore, the monitoring hub 114 can include one or more processors for executing instructions stored in storage and/or received from one or more other electronic devices, for example, over network 110. The application programs can be implemented as instructions that are stored in the storage components and that, when executed, cause the one or more processors to provide the features described herein by the building monitoring system 104. In addition, the monitoring hub 114 can include network interfaces and communication devices for sending and receiving data through network 110. In some examples, the monitoring system can be implemented as a server or server system, for example, in a building monitoring system 104 for a large commercial building.

The interface devices 106 can be a control panel 106a, a computing device 106b (e.g., a laptop or desktop computer), or a mobile device 106c (e.g., a mobile phone, a smartphone, personal digital assistant (PDA), or a tablet computer). The interface devices 106 can have one or more user interfaces such as, for example, a display screen (e.g., a touch screen), an audio system, and a voice command system. In some examples, the user can control application programs executed by or displayed on the interface devices 106 through touch inputs, gesture inputs, or voice commands. In addition, the interface devices 106 can have having internal or external storage components storing data and programs such as an operating system and one or more application programs. Furthermore, the interface devices 106 can include one or more processors for executing instructions stored in storage and/or received from one or more other electronic devices, for example, over network 110. The application programs can be implemented as instructions that are stored in the storage components and that, when executed, cause the one or more processors to provide the features described herein to the interface devices 106. In addition, the interface devices 106 can include network interfaces and communication devices for sending and receiving data through network 110.

In some examples, an interface device 106, such as control panel 106a, is a component of the building monitoring system 104. In other words, the control panel 106a can be integrated with the building monitoring system 104 and serve as a user interface for the monitoring hub 114, for example, as a central user interface for the building monitoring system 104. In such examples, the building monitoring system 104 can still be in communication with other interface devices 106b, 106c such as, for example, remote interface devices.

The third-party content sources 108 can be implemented using one or more computing devices (e.g., servers) configured to interface with the building monitoring system 104 over the network 110. The computing devices on which the third-party content sources 108 are implemented can have internal or external storage components and can represent various forms of server systems including, but not limited to a web server, an application server, a proxy server, a network server, a user account server, or a server farm.

Furthermore, the computing devices on which third-party content sources 108 are implemented each can include one or more processors for executing instructions stored in storage and/or received from one or more other electronic devices, for example over network 110. In addition, these computing devices can also include network interfaces and communication devices for sending and receiving data. In some implementations, the third-party content sources 108 can include a user account system such as, for example, a user account system hosting a user's account at an insurance provider.

In operation, the building monitoring system 104 detects damage to the building 102 and can alert a user to the damage. In some examples, the building monitoring system 104 can coordinate repairs for any detected damage. More specifically, when one or more sensors of the sensor network 112 detect damage to the building 102, the monitoring hub 114 receives damage data from the corresponding sensors 116. The damage data can include indications of the location and extent of the damage. In some implementations, the damage data can include an indication of whether a temporary repair has been made and the extent or quality of the repair. As described in more detail below, in some examples, the sensors 116 can be passive devices that transmit analog electrical signals to the monitoring hub 114. In some examples, the sensors 116 can be digital devices that transmit more complex digital data (e.g., in the form of data packets) to the monitoring hub 114. Accordingly, the term "damage data" as used herein refers to one or more of analog signals electrical signals and digital data.

In response to receiving the damage data, the monitoring hub 114 can provide a damage alert to one of the user interface devices 106 for presentation to the user. For example, the damage alert can include a graphical representation of the building and an icon representing the location and extent of the detected damage. For example, the location of the damage can be determined based on which sensors provide indications of damage. For instance, the monitoring hub 114 can use a mapping indicating the physical locations of the sensors 116 in the sensor network 112 to determine a location of the sensors providing damage data, thus, the location of the damage. Similarly, the extent of the damage can be determined by, for example, the number of sensors providing damage data. For example, damage of greater severity can be indicated based on receiving damage data from multiple sensors, while damage of lesser severity can be indicated based on receiving damage data from a single sensor.

In addition, the monitoring hub 114 can coordinate repairs for the damage. For example, the monitoring hub 114 can access information about building contractors and services from one or more third-party content sources 108. The monitoring hub 114 can evaluate the accessed information and the damage data and select data related to one or more contractors to recommend to the user as part of the damage alert. For example, if the data damage indicates that damage has occurred to the roof of the building, the monitoring hub 114 can select roofing contractors. For example, the damage alert can include a list of local repair contractors and their associated contact information (e.g., phone numbers, e-mail addresses, website addresses, and hyperlinks).

In some implementations, the monitoring hub 114 sends requests for repair estimates to the selected contractors. The monitoring hub 114 can send the repair cost and timing estimates received from the contractors to the user, for example, through a control panel 106a or by electronic message (e.g., e-mail, text message, notifications in the user's account, etc.)

to the user's computing device 106b or mobile device 106c.

In some implementations, the monitoring hub 114 can access weather information (e.g., local weather information) from sources such as NOAA or local weather stations (e.g., one of the third-party content sources 108). The weather information can be incorporated as a factor in scheduling repairs. For example, if a major storm is predicted, the monitoring hub 114 can prioritize scheduling the repair for dates prior to the storm. In some examples, the monitoring hub 114 can place the building monitoring system 104 in an "alert" status based on the weather information. For example, if a major storm is predicted, the monitoring hub 114 can perform a self-diagnostics check of the sensor network 112 to ensure that the building monitoring system 104 is functioning properly. If needed, the monitoring hub 114 can alert a user to any system errors or maintenance that should be corrected or performed prior to the storm.

In some implementations, the monitoring hub 114 can be in communication with a user account system (e.g., one of the third-party content sources 108). The user account system can be a user account system at an insurance provider that includes a user account associated with an insurance policy for the building 102. The monitoring hub 114 can send a damage report (e.g., generated from the damage data) to the user account system. The damage report can include the damage data, a damage assessment made by the monitoring hub 114 based on the damage data (e.g., type, location, and extent of damage), or both. The user account system can evaluate the damage report and, through the user's account, generate an insurance claim based on the damage data. In some examples, the user account system can also send requests for repair estimates to contractors near the location building 102 depending on the extent of the damage. The user account system can send the repair cost and timing estimates received from the contractors to the user, for example, through the building monitoring system 104 or by electronic message to the user (e.g., e-mail, text message, notifications in the user's account, etc.). The user account system can, in some examples, prompt a customer service representative to contact the user (e.g., call the user's mobile or home telephone) to coordinate repairs.

In some implementations, the monitoring hub 114 or the user account system can coordinate autonomous inspections of the damage to the building 102. For example, the user account system can coordinate aerial inspections of a building 102 to verify or further evaluate the damage to the building 102. In some examples, the user account system can obtain high resolution images of the building 102 from an aerial inspection. For example, the computing system can coordinate a drone 120 flight over the building 102. For example, the drone 120 can fly over the building 102 to capture images of the building 102. In some examples, the drone 120 can transmit the images to the user account system for further analysis.

As another example, in some implementations, the user account system can coordinate high resolution imagery to be taken of the building 102 by a satellite 122 and transmitted to the user account system. For example, the user account system can coordinate with a satellite control system to obtain the satellite images of the building 102. The user account system can receive the images from the satellite 122 and perform additional analysis of the damage to the building 102 based on the images. In some examples, the drone 120 or satellite images can be infrared images. In some implementations, the aerial image(s) can be sent to one or more user interface devices 106a, 106b, 106c, for display to a user.

In some examples, the user account system or the monitoring hub 114 can further evaluate the damage to the building 102 by analyzing the images. For example, the user account system can employ image processing techniques to verify the location of the damage and evaluate the extent of the damage. For example, the user account system can evaluate contrasts and edges within the images to determine a size of a hole in a roof. In some examples, the user account system can use an infrared image to determine the extent of the damage (e.g., based on warm or cool air escaping from the damaged section). In some implementations, the user account system or the monitoring hub 114 can use the damage report or sensor data from the building monitoring system to perform the analyses on the images. For example, the user account system can use the sensor data to refine the analyses of an image to the expected location of the damage within the image. For example, if the sensor data indicates that the damage is in the North-West corner of the building's 102 roof, the user account system can tailor the image analysis to the portion of the image that shows the North-West corner of the roof.

In some implementations, the building monitoring system 104 can provide an automatically generated cost estimate for the building repairs for comparison with contractor estimates. This cost estimate may assist the user in ensuring that the roofing contractors are providing competitive repair bids. For example, the monitoring hub 114 can send the damage data to a cost estimate system (e.g., one of the third-party content sources 108). The cost estimate system can include a database of building repair data and associated costs. The cost estimate system can generate an impartial repair cost estimate based on the received damage data, and send the estimate to the monitoring hub 114. The monitoring hub can include the automatically generated cost estimate, when the monitoring hub 114 provides the user with contractor repair estimates. In some examples, the cost estimate system can be part of an insurance provider computing system, for example, a building repair database at an insurance provider.

In some implementations, the sensors 116 can be configured with the ability to make automatic repairs to the damage. For example, the sensors 116 can include self-healing materials such as, for example, self-healing polymers, clay beads, microcapsules. The self-healing material can be activated by the damage directly (e.g., an impact or moisture that activates a catalyst or opens microcapsules containing a catalyst) or by an activation mechanism (e.g., an electrical pulse to start a reaction or a mechanical application device) controlled from the monitoring hub 114. For example, self-healing material may be used to fill a crack or hole in a building material and provide a temporary repair to prevent further damage until a permanent repair can be made.

In some implementations, the monitoring hub 114 can determine the strength or sufficiency of a repair from damage data received form the sensor network 112, and can use such information to schedule a permanent repair. For example, if the repair is determined to be weak the building monitoring system can weigh repair timing more highly than repair cost when coordinating repairs and selecting contractors, or when submitting an insurance claim. In some implementations, the self-healing material can be separate from the sensors. For example, the self-healing material can be part of the building material surrounding the sensors. In some implementations, the aerial inspection can be used to inspect the quality of the self-healing material repair. For example, the image(s) from the aerial inspection can be analyzed to determine the sufficiency of self-healing material repair.

FIG. 1B shows the system 100 in the event that the building monitoring system 104 is damaged, losses power, or otherwise loses communication with the user account system. In some implementations, the user account system can monitor the operational status of building monitoring system 104. For example, the building monitoring system 104 can transmit a liveness signal to the user account system to verify proper operations of the building monitoring system 104. The user account system can detect a problem with the building monitoring system 104 if the user account system does not receive the liveness signal for a predefined period of time. For example, the building monitoring system 104 may be damaged or may lose power and cease transmitting the liveness signal. In some examples, the building monitoring system 104 can include a backup power source (e.g., a battery), however, communications between the monitoring hub 114 and the user account system may still be lost if the building 102 loses power.

In some implementations, the user account system can coordinate with an external signaling device to send a wireless signal to the building monitoring system 104 and, thereby, remotely query the sensor network 112 of the building monitoring system 104. For example, the external signaling device can be a drone 120, another building monitoring system 132 installed in another building 130, or a signaling device 142 installed in a vehicle 140. For example, the sensor network 112 can include a transceiver that allows the sensor network 112 to receive the signal, query the sensors for damage, and send a response to the external device. In some implementations, the sensor network 112 can operate in a passive state, in which, energy from the signal is used to provide temporary power to the sensor network 112. In some examples, the energy from the signal can provide sufficient power for the sensor network 112 to respond to the signal.

In some examples, the drone 120 can include a signaling device that can transmit query signals to a building sensor network 112 and receive response signals from the sensor network 112. The drone 120 (e.g., the signaling device on the drone 120) can send the response signals to the user account system, for example, through network 110.

In some examples, one or more buildings 130 within a geographic area can be designated as external signaling stations. In some examples, a building 130 (e.g., a home, a fire or police station, a neighborhood community center, a condominium association center, etc.) with an installed building monitoring system 132 may be designated as an external signaling station for a geographic region. The building monitoring system 132 of the designated building 130 can include a signaling device that can transmit query signals to other building sensor networks 112 and receive response signals from the other sensor networks 112. The building monitoring system 132 of the designated building 130 can then send the response signals to the user account system, for example, through network 110. In some examples, a building 130 may be selected as an external signaling station because the building includes a backup power generator 134. For example, a home owner who installs a backup generator 134 may receive discounted monitoring services for their own building monitoring system 132 for serving as a signaling station.

In some examples, a vehicle 140 (e.g., an automobile) can be used as an external signaling station. For example, a vehicle 140 can include a signaling device that can transmit query signals to a building sensor network 112 and receive response signals from the sensor network 112. The vehicle 140 (e.g., the signaling device on the vehicle 140) can send the response signals to the user account system, for example, through network 110. For example, an emergency services vehicle 140 (e.g., a fire truck or ambulance) can be outfitted with a signaling device. For example, the user account system can coordinate with the signaling device to query building monitoring systems 104 of buildings 102 that have lost power during a storm as the vehicle 140 drives past the buildings 102.

In one example situation, the building monitoring system 104 may lose power and, thus, cease transmitting a liveness signal to the user account system. The user account system can coordinate with a drone 120 to provide a query signal to the sensor network 112 of the building monitoring system 104. A transceiver in the sensor network 112 can receive the signal and transmit the response to the sensor network 112. The sensor network 112 can provide a response to the signal that indicates whether or not the building 102 is damaged. The transceiver can transmit the response to the drone 120. The drone 120, in turn, can transmit the response from the sensor network 112 to the user account system through network 110. The user account system can then process the response to identify and evaluate any damage to the building 102 in a manner similar to that described above in reference to FIG. 1A.

In some examples, the response, similar to the damage data discussed above, can include indications of the location and extent of the damage. In some implementations, the response can include an indication of whether a temporary repair has been made (e.g., whether a self-healing material has been activated) and the extent or quality of the repair. If necessary, the user account system can use the data contained in the response to coordinate repairs for the building 102, as discussed above.

In some implementations, the user account system can coordinate automatic repairs of damage to a building 102. For example, the user account system can coordinate with the same external signaling source that sent the query signal or a different external signaling source to send a repair signal to the network sensors 112. For example, the repair signal can cause the sensor network 112 to issue an appropriate activation signal to one or more of the sensors 116 to activate a self-healing material, as discussed above.

In a second example situation, the building monitoring system 104 of a building 102 may lose power and, thus, cease transmitting a liveness signal to the user account system. Furthermore, the roof of the building 102 may be damaged after the building monitoring system 104 lost power, and thus, the damage would not have been reported to the user account system. After detecting that the liveness single from the building monitoring system 104 has not been received for a predetermined period of time, the user account system can coordinate with a building monitoring system 132 designated as a signaling station to provide a query signal to the sensor network 112 of the building monitoring system 104 that lost power. For example, the designated building monitoring system 132 may be installed in a building 130 in the same neighborhood as the building 102. A transceiver in the sensor network 112 can receive the signal and transmit the response to the sensor network 112.

The sensor network 112 can provide a response to the signal that indicates whether or not the building is damaged. The transceiver can transmit the response to the designated building monitoring system 132. The designated building monitoring system 132, in turn, can transmit the response from the sensor network 112 to the user account system through network 110. The user account system can then process the response to identify and evaluate the damage to the building's 102 roof in a manner similar to that described above in reference to FIG. 1A.

Furthermore, the user account system can store date related to characteristics of the building monitoring system 104. For example, the characteristics can include, data related to the type of sensors 116 installed in a building monitoring system 104, whether the sensors 116 include self-healing materials, and, if so, how the self-healing materials are activated. In the present example situation, the user account system may determine that the building monitoring system 104 includes self-healing materials that require an activation signal to be activated. In order to prevent additional damage, the user account system can coordinate with the building monitoring system 104 to send a repair signal to the sensor network 112 of the building monitoring system 104 that lost power. The repair signal can direct the sensor network 112 to provide activation signals to the proper sensors 116 that include the self-healing materials and which are located in the damaged area of the building's 102 roof.

In some implementations, when the user account system detects a problem with a building monitoring system 104 (e.g., when a liveness signal is not received), the user account system can coordinate autonomous inspections of the building 102 for damage. For example, the user account system can coordinate aerial inspections of a building to identify damage to the building 102. In some examples, as discussed above, the user account system can obtain high resolution images of the building 102 from an aerial inspection. For example, the user account system can coordinate with a drone or a satellite to obtain images of the building 102. The user account system can perform image processing analyses on the images to identify and evaluate any damage to the building 102.

Figure 2A:
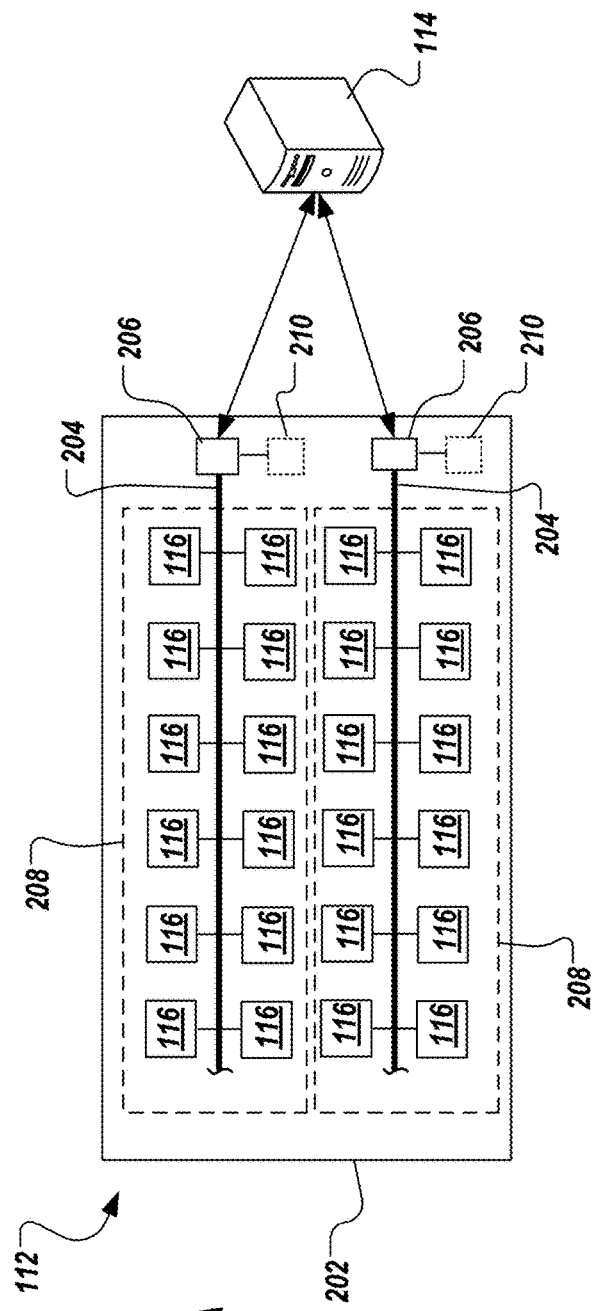
FIGS. 2A and 2B depict an example sensor network in accordance with implementations of the present disclosure.
Figure 2B:
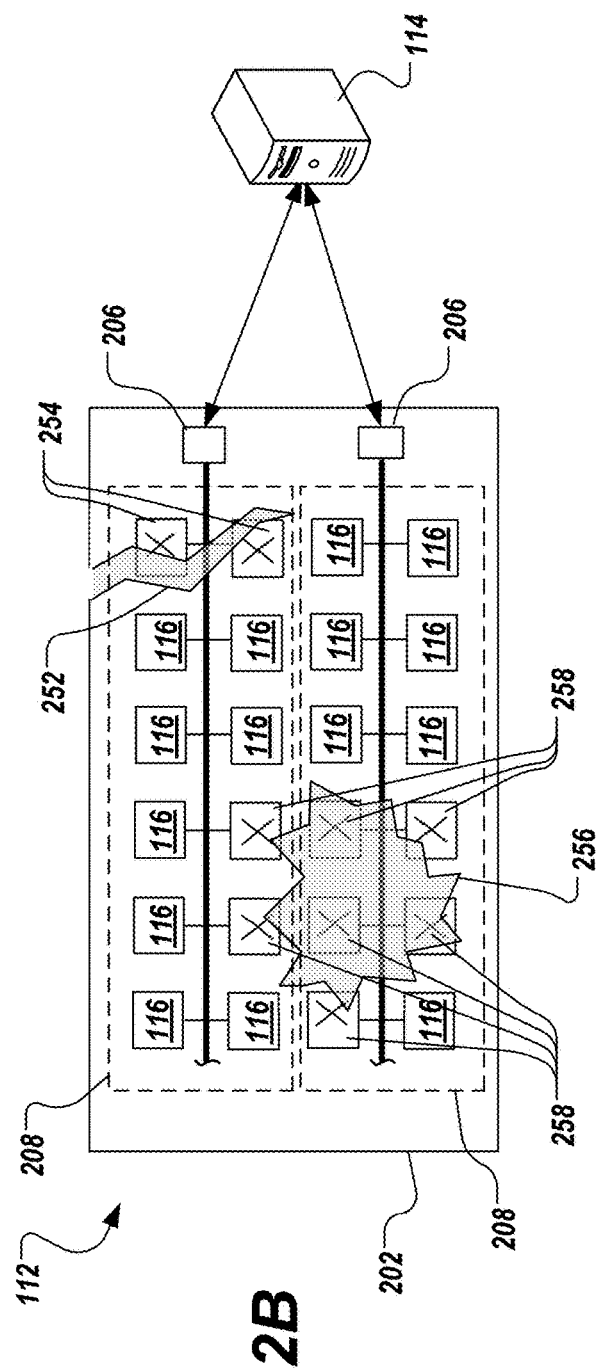

FIGS. 2A and 2B depict an example sensor network 112 in accordance with implementations of the present disclosure. The sensor network 112 includes a plurality of sensors 116 applied to a building material 202. Each sensor 116 can be electrically connected, for example, by a wiring bus 204 to a communication module 206. The communication module 206 can include a processor (or microcontroller) and a communication interface. The communication module 206 can provide a common communication link between sets 208 of sensors 116 in the sensor network 112 and the monitoring hub 114. For example, the communication module 206 can be in communication with the monitoring hub 114 by a wired or wireless communication network. The communication module 206 can, for example, receive damage signals from associated sensors 116 and transmit damage data to the monitoring hub 114. In addition, the sensors 116 can be individually powered or the sensors 116 can receive power from the communication module 206.

In some examples, each sensor 116 in the network 112 can be mapped to a physical location on the building material, for example, by a code or serial number assigned to the sensor 116. In some examples, the monitoring hub 114 can have a master mapping of all of the sensors 116 in the sensor network 112. In some implementations, sensor sets 208 can be mapped to physical locations on the building material 202 or in the building instead of individual sensors 116. For example, a sensors set 208 can be mapped by a code or serial number assigned to a respective communication module 206. In such implementations, the monitoring hub 114 can have a mapping of all of the sensor sets 208 (e.g., communication modules 206) in the sensor network 112. In either case, the damage data received by the monitoring hub can include serial numbers associated with the sensors 116 or sensor sets 208 that detect damage, and monitoring hub 114 can use the appropriate sensor 116 or sensor set 208 mapping to determine the location of the damage within a building.

Furthermore, the extent of damage can be determined based on the number and proximity of sensors 116 that detect damage. For example, FIG. 2B depicts an example sensor network 112 in which damage to the building material 202 has occurred. For example, crack 252 is shown as activating two sensors 254. Accordingly, the communicating module 206 associated with sensors 254 receives indications of damage from both sensors 254. The communication module 206 send damage data to the monitoring hub 114 indicating that only a small number of sensors 254 (e.g., two) are reporting damage. For example, the monitoring hub 114 may determine that the damage is minor because only two sensors have been activated to indicate damage.

On the other hand, the hole 256 may activate seven sensors 258, including sensors from multiple sensor sets 208. In response to detecting the hole 256, the communication modules 206 associated with both of the depicted sets 208 can send damage data to the monitoring hub 114. The monitoring hub 114 can determine based on the damage data that seven sensors 258 are reporting indications of damage and that the damage extends across two sensor sets 208. The monitoring hub 114 may, for example, determine that the damage 256 is significant because a larger number of sensors 116 (e.g., seven) have indicated damage, and the sensors 258 are from multiple sensor sets 208. In addition, the monitoring hub 114 can distinguish the crack 252 is likely separate damage from the hole 256 based on the physical mapping of the sensors 116. For example, based on the mapping, the monitoring hub 114 can determine that the physical proximity between all of the activated sensors 254, 258 reporting indications of damage and distinguish between, for example, a single large hole or crack from multiple smaller holes or cracks. In some implementations, the mapping can also be used to determine a likely shape of the damage, and thereby, the severity of the damage. For example, based on the mapping the monitoring hub 114 may determine that the seven sensors 258 form a relatively circular shape. Thus, the damage associated with the seven sensors 258 is likely a hole instead of a long relatively straight crack. The monitoring hub 114 can, for example, use such information to evaluate the urgency with which a repair is needed, and provide more accurate information to contractors and insurance providers. For instance, a hole in the roof may require more urgent, and potentially costlier, repairs than a crack.

Referring again to FIG. 2A, in some implementations, the communication modules 206 can include wireless transmitters and receivers (or a transceiver). For example, the communication modules 206 can communicate with the monitoring hub 114 over wireless communication channel. In some examples, the wireless transmitters and receivers can be used to transmit and receive signals to/from external signaling sources, as discussed above. In some examples, the communication modules 206 can include backup power supplies 210. The backup power supplies can be used to provide power to the associated set of sensors 116 when responding to a query signal form an external signaling device. In some examples, the communication modules 206 can use a portion of the energy from a signals sent by an external signaling device to power the associated sensors 115 and transmit a response to the external signaling device. For example, the communication modules 206 can include active or passive radio frequency identification (RFID) telemetry circuits. In some examples, each sensor 116 can include a wireless transmitter and receiver (or a transceiver). For example, each sensor 116 can include an active or passive RFID telemetry circuit.

Figure 3:
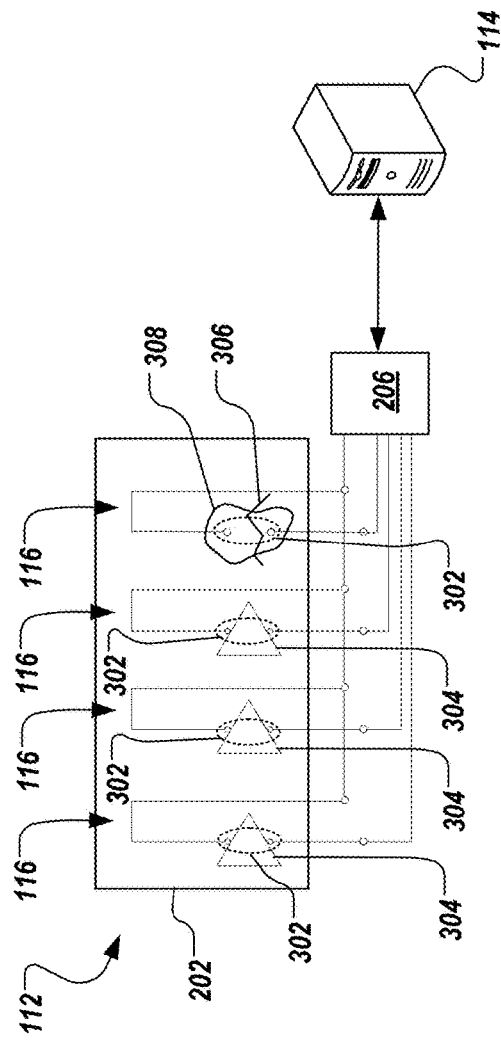
FIG. 3 depicts an example sensor network in accordance with implementations of the present disclosure.

FIG. 3 depicts an example sensor network 112 in accordance with implementations of the present disclosure. In the example implementation shown, the sensors 116 include an open circuit 302 and a container 304 with an electrically conductive self-healing material (e.g., liquid sodium acetate). When damage occurs to the building material 202, such as crack 306, the container 304 is broken by, for example, an impact that caused the damage. The brake in the container 304 can activate the self-healing material. For example, the self-healing material 308 can leak out of the container 304 filling the crack 306. In addition, the impact can cause the self-healing material 308 to crystallize, thereby sealing the crack 306. Because the self-healing material 308 is conductive, it will also conduct electricity through the open circuit 302 in the sensor, and thereby, cause an electrical signal to be transmitted through the bus 204 to the communication module 206. The communication module 206 can then send damage data to the monitoring hub 114 indicating that the sensor 116 had detected damage and that the self-healing material 308 has been activated.

In some implementations, the sensors 116 can be integral to the building material. For example, the sensors can be sandwiched between layers of the building material or otherwise embedded within the building material.

Figure 4:
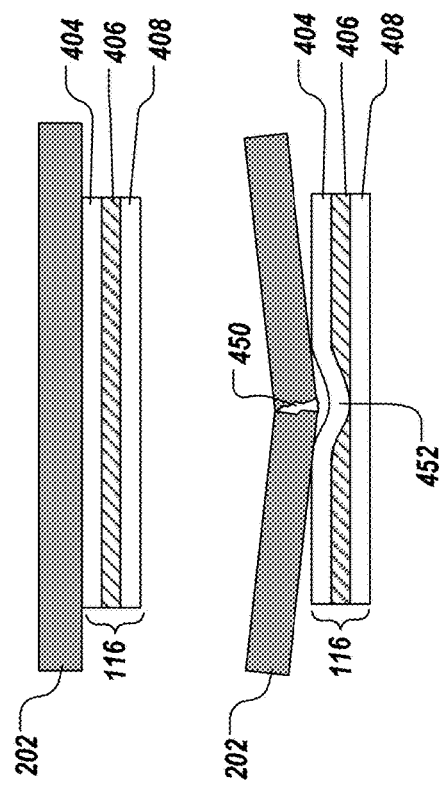
FIG. 4 depicts an example sensor in accordance with implementations of the present disclosure.

FIG. 4 depicts an example sensor 116 in accordance with implementations of the present disclosure. The sensor 116 is attached to a surface of a building material 202. The sensor 116 includes a first electrically conductive layer 404 and a second electrically conductive layer 408 separated by an electrical insulating layer 406. The electrical insulating layer 406 creates an open circuitry between the first and second electrically conductive layers 404, 408. When the building material 202 is damaged 450 the impact on the building material that caused the damage 450 also creates a deformation 452 in the first electrically conductive layer 404. If the damage is sufficiently sever, the first electrically conductive layer 404 can be deformed sufficiently to penetrate the electrical insulating layer 406 and contact the second electrically conductive layer 408. Under sufficient force, the deformation 452 in the first electrically conductive layer 404 effectively closes the open circuit between the two electrically conductive layers 404, 408 and generates a damage indication signal that is received by an associated communication module. In some implementations, the sensors 116 can be integral to the building material. For example, the sensors can be sandwiched between layers of the building material or otherwise embedded within the building material.

Figure 5:
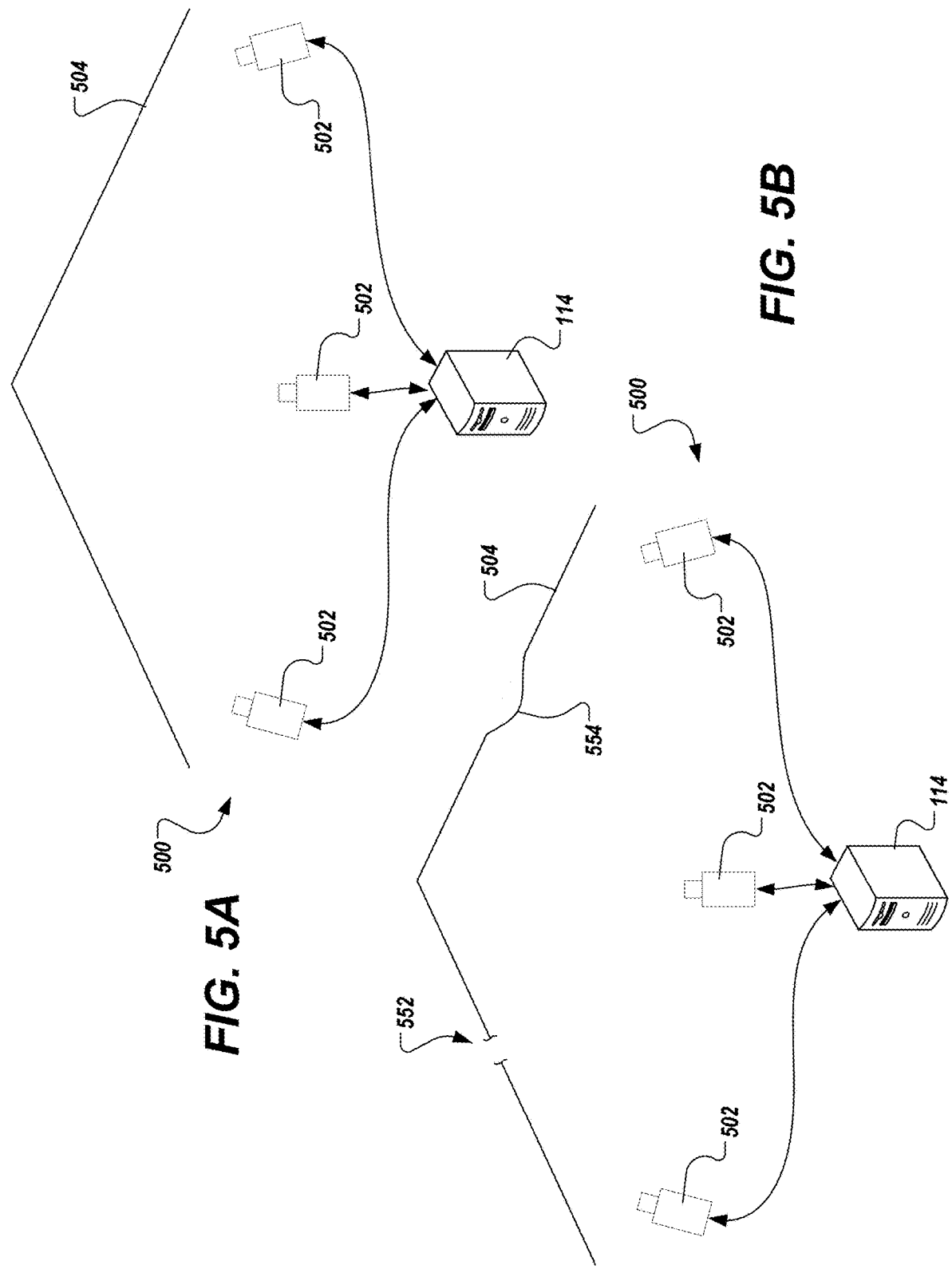
FIGS. 5A and 5B depict another example sensor network in accordance with implementations of the present disclosure.

FIGS. 5A and 5B depict another example sensor network 500 in accordance with implementations of the present disclosure. Referring first to FIG. 5A, the sensor network 500 includes a plurality of cameras 502 arranged within a building to capture images of one or more building materials. The cameras 502 are in wired or wireless communication with the monitoring hub 114. The cameras 502 are used to capture images of a building material, for example, the underside of roof 504 at a time prior to any damage occurring to the roof 504 (e.g., after construction of the building or soon after a renovation). The monitoring hub 114 can use one or more images from each of the cameras 502 to generate an initial three-dimensional (3D) computer model of the roof 504, for example, using 3D reconstruction techniques. The initial 3D computer model represents the undamaged shape and structure of the building materials (e.g., the roof 504), and thus, may be considered an undamaged model. For example, the cameras 502 can be arranged within the attic of a home so as to capture images of the underside of the roof. The monitoring hub 114 can use the images to create a 3D computer model of the roof.

In order to detect damage, the cameras can be configured capture images of the roof 504 at regular intervals (e.g., hourly, daily, weekly). The monitoring hub 114 can use one or more images from each of the cameras 502 to generate an subsequent three-dimensional models of the roof 504 and compare the subsequent models to the undamaged model. By comparing the subsequent models to the undamaged model, the monitoring hub 114 can detect alterations in the shape of the roof 504 that may indicate damage. For example, a comparison performed by the monitoring hub 114 of an undamaged model of the roof with a subsequent model of the damaged roof 550 illustrated in FIG. 5B can reveal the hole 552 and the roof warping 554. Upon detecting the damage, the monitoring hub 114 can alert the user to the damage and begin coordinating repairs, as described above.

In some implementations, the cameras 502 can be triggered to capture images at irregular intervals. For example, the cameras 502 can be triggered to capture images by a user. For example, the user can perform damage checks on the roof 504 by selecting a damage check control on a user interface device. The monitoring hub 114 can the cause the cameras 502 to capture images of the roof 504 and generate a 3D model for comparison with the undamaged model. For instance, if the user hears a bang on the roof 504 during a thunder storm, the user may wish to perform a damage check on the roof 504. In such cases, the monitoring hub 114 can provide the user with an alert whether or not damage is detected. In other words, even if no damage is detected the monitoring hub 114 may provide the user with an alert indicating that the roof 504 has not been damaged.

Figure 6:
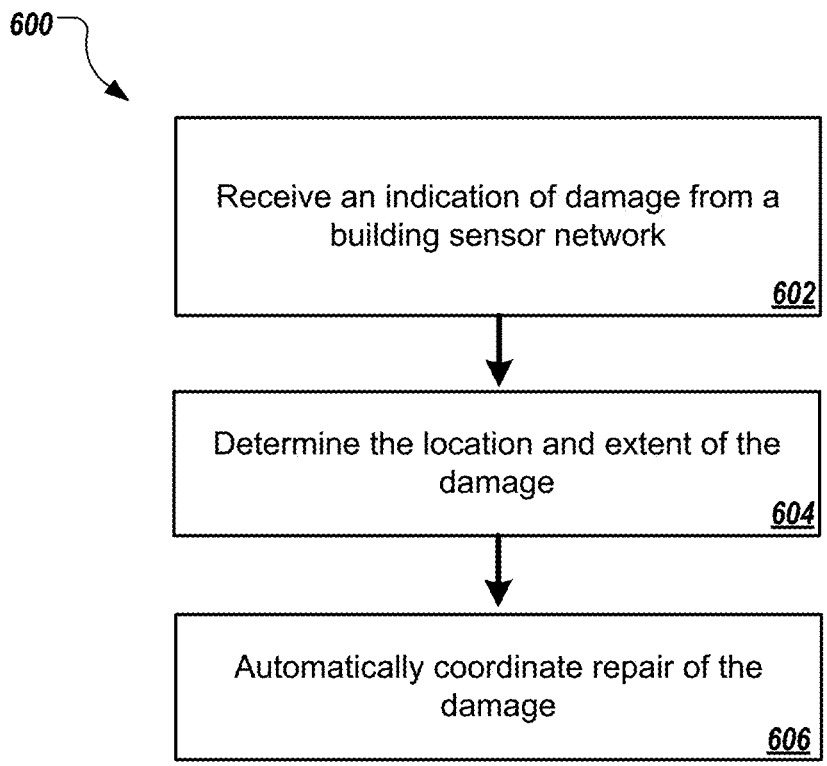
FIGS. 6-8 depict example processes that can be executed in accordance with implementations of the present disclosure.

FIG. 6 depicts an example process 600 that can be executed in accordance with implementations of the present disclosure. In some examples, the example process 600 can be provided as one or more computer-executable programs executed using one or more computing devices. In some examples, the process 600 is performed by a building monitoring system (e.g., building monitoring system 104 of FIGS. 1A and 1B). In some examples, the process 600 is performed by a user account system (e.g., a user account system hosted by third party systems 108 of FIGS. 1A and 1B) that is associated with a building monitoring system.

An indication of damage to a building is received from a sensor network associated with the building (602). The sensor network is configured to monitor for damage to the building. For example, the sensor network can detect damage caused to the building by impacts (e.g., hail, falling tree branches, or flying debris in a wind storm). In some examples, the sensor network can detect warping, for example, due to water damage or excessive heat.

A location and an extent of the damage to the building is determined based on the received indication (604). For example, the damage indication can include damage data. The damage data can indicate the location and number of sensors that have been activated by the damage. In some samples, the damage data can indicate the identity of the sensors that have been activated by the damage, for example, by indicating code or serial numbers of the activated sensors. The building monitoring system can include a mapping of the physical location of the sensors and can determine the location of the damage based on the received sensor identities and the mapping.

In response to determining the location and the extent of the damage, a repair for the damage is automatically coordinated (606). For example, an alert indicating the location and extent of the damage to the building can be sent to a user interface device such as, for example, a control panel or a user computing device. In some examples, the building monitoring system can identify building repair services (e.g., contractors) to repair the damage, and include contact information for the identified building repair services in the alert to the user. In some implementations, the building monitoring system can send a damage report to a user account system of an insurance provider. The damage report can include location and extent of the damage as determined from the sensor network. The building monitoring system can request to open an insurance claim for repairing the damage based on the damage report.

In some implementations, the building material can include self-healing materials to automatically repair the damage. The self-healing materials can be activated by the damage itself (e.g., by an impact) or by a signal from the building monitoring system. In some implementations, the damage indication includes data indicating that the damage has been at least partially repaired by a self-healing material.

Figure 7:
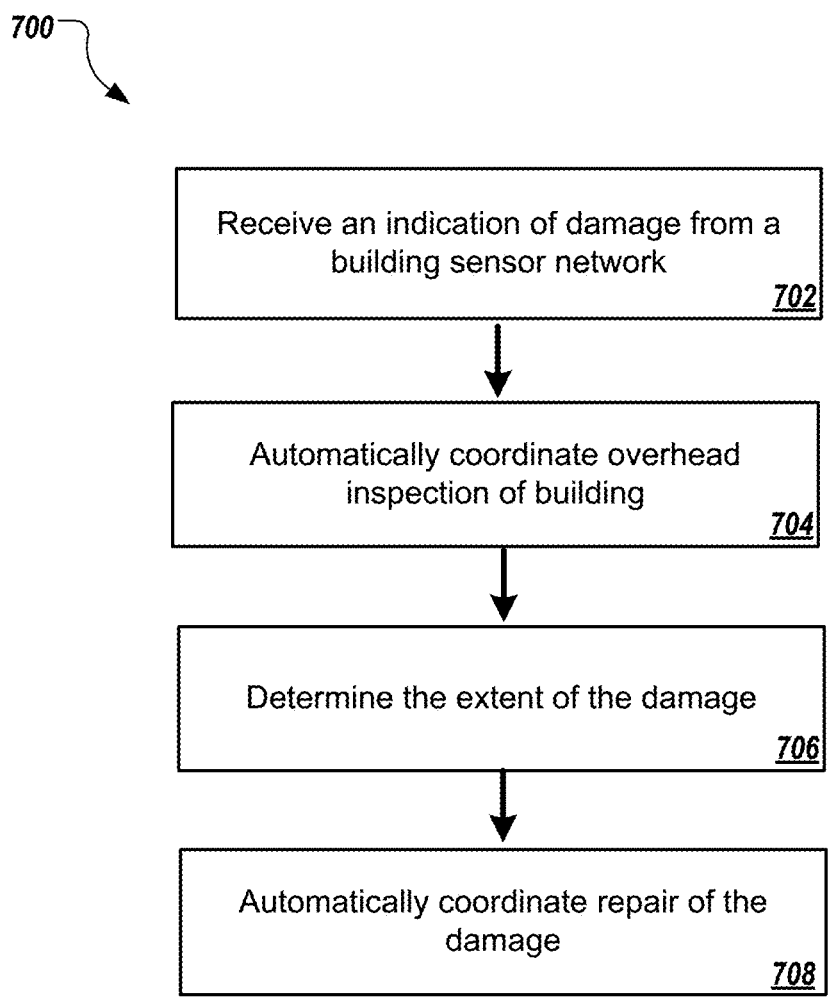

FIG. 7 depicts an example process 700 that can be executed in accordance with implementations of the present disclosure. In some examples, the example process 700 can be provided as one or more computer-executable programs executed using one or more computing devices. In some examples, the process 700 is performed by a building monitoring system (e.g., building monitoring system 104 of FIGS. 1A and 1B). In some examples, the process 700 is performed by a user account system (e.g., a user account system hosted by third party systems 108 of FIGS. 1A and 1B) that is associated with a building monitoring system.

An indication of damage to a building is received from a sensor network associated with the building (702). The sensor network is configured to monitor for damage to the building. For example, the sensor network can detect damage caused to the building by impacts (e.g., hail, falling tree branches, or flying debris in a wind storm). In some examples, the sensor network can detect warping, for example, due to water damage or excessive heat. In some examples, the indication of damage can be received by a building monitoring system. In some examples, the indication can be sent from a building monitoring system to a user account system.

An overhead inspection of the building is automatically coordinated (704). For example, the building monitoring system or the user account system can automatically coordinate an aerial inspection of the building in response to receiving the indication of damage. In some examples, the overhead inspection can be coordinated with a drone. For example, a drone flight over the building can be scheduled. The drone can capture images of the building and send the images to the building monitoring system or the user account system for analysis. In some examples, the overhead inspection can be coordinated with a satellite. For example, the building monitoring system or the user account system can coordinate with a satellite control center to obtain satellite images of the building. The satellite images can be sent to the building monitoring system or the user account system for analysis.

A location and an extent of the damage to the building is determined based on the images (706). For example, image processing analyses can be performed on the images to identify the damage and determine the extent of the damage. In some examples, damage data from sensors in the building monitoring system can be used to aid in identifying the location of the damage within the image. In some examples, the images are used to verify the location and extent of the damage as reported by the building monitoring system sensors.

A repair for the damage is automatically coordinated (708). For example, an alert indicating the location and extent of the damage to the building can be sent to a user interface device such as, for example, a control panel or a user computing device. In some implementations, the aerial image(s) can be sent to the user interface device. In some examples, the building monitoring system or user account system can identify building repair services (e.g., contractors) to repair the damage, and include contact information for the identified building repair services in the alert to the user. In some examples, the aerial image(s) can be sent to repair contractors, for example, to aid in generating repair bids. In some implementations, the building monitoring system can send a damage report to the user account system. The damage report can include location and extent of the damage as determined from the sensor network. In some implementations, the user account system can open an insurance claim for repairing the damage based on the damage report.

Figure 8:
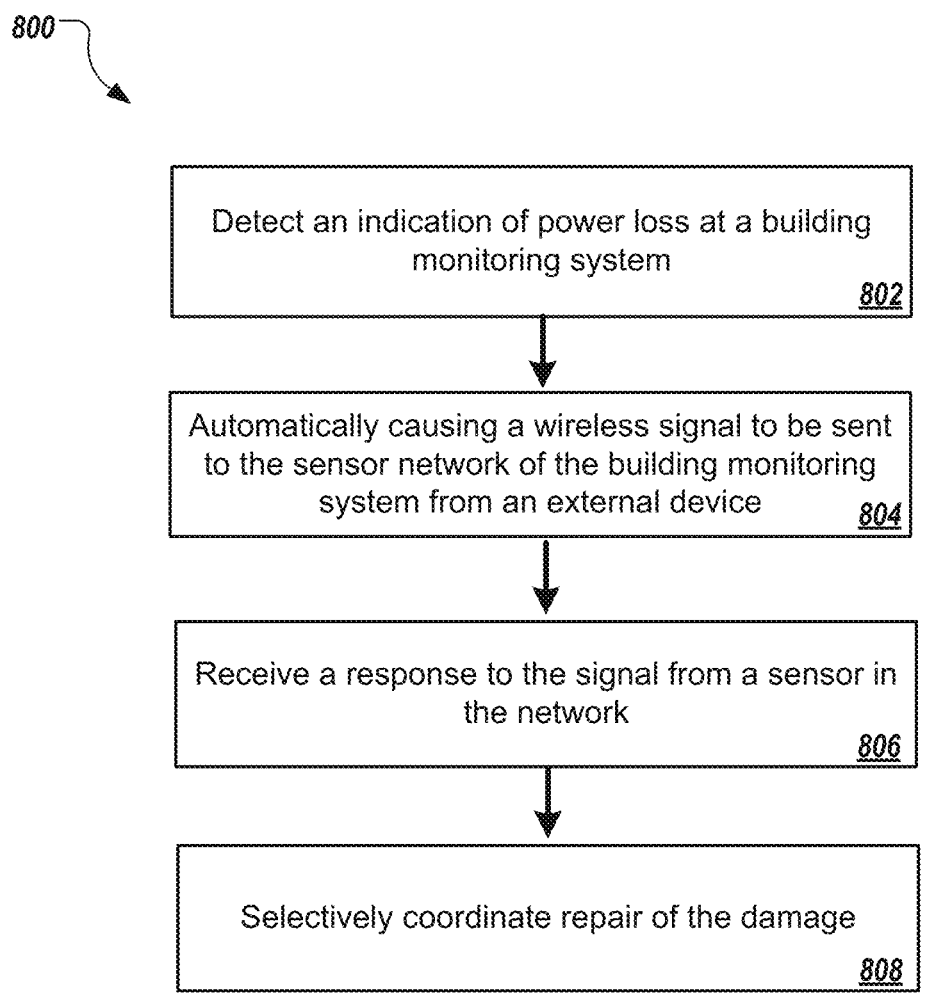

FIG. 8 depicts an example process 800 that can be executed in accordance with implementations of the present disclosure. In some examples, the example process 800 can be provided as one or more computer-executable programs executed using one or more computing devices. In some examples, the process 800 is performed by a user account system (e.g., a user account system hosted by third party systems 108 of FIGS. 1A and 1B) that is associated with a building monitoring system (e.g., building monitoring system 104 of FIGS. 1A and 1B).

An indication of a power loss at building monitoring system is detected (802). For example, the building monitoring system can transmit a liveness signals to a user account system at a regular interval. The user account system can detect a power loss or other malfunction at the building monitoring system if the liveness signal ceases for a predefined period of time.

The user account system automatically causes a wireless signal to be sent to the sensor network of the building monitoring system from an external signaling device (804). For example, the user account system can coordinate with an external signaling device (e.g., a drone, another building monitoring system, or a vehicle based signaling device) to transmit a query signal to the sensor network of the building monitoring system that lost power. The sensor network of the building monitoring system can include circuitry (e.g., RFID telemetry circuitry) to receive the query signal, query sensors for damage, and transmit a response signal to the external signaling device.

A response to the signal is received from a sensor in the sensor network (806). For example, the external signaling device can receive the response and send the response to the user account system. The response can indicate whether the building is damaged. In some examples, the response can include indications of the location and extent of the damage.

In some implementations, the response can include an indication of whether a temporary repair has been made (e.g., whether a self-healing material has been activated) and the extent or quality of the repair. If necessary, the user account system can use the data contained in the response to coordinate repairs for the building, as discussed above.

A repair for the damage is selectively coordinated based on the response (808). For example, if the response indicates that the building is damaged, the user account system can automatically coordinate a repair for the damage. For example, an alert indicating the location and extent of the damage to the building can be sent to a user interface device such as, for example, a control panel or a user computing device. In some examples, the user account system can identify building repair services (e.g., contractors) to repair the damage, and include contact information for the identified building repair services in the alert to the user. In some implementations, the user account system can open an insurance claim for repairing the damage based on the damage report.

Implementations of the subject matter and the operations described in this specification can be realized in digital electronic circuitry, or in computer software, firmware, or hardware, including the structures disclosed in this specification and their structural equivalents, or in combinations of one or more of them. Implementations of the subject matter described in this specification can be realized using one or more computer programs, i.e., one or more modules of computer program instructions, encoded on computer storage medium for execution by, or to control the operation of, data processing apparatus. Alternatively or in addition, the program instructions can be encoded on an artificially generated propagated signal, for example, a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer, storage medium is not a propagated signal; a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, for example, an FPGA (field programmable gate array) or an ASIC (application-specific integrated circuit). The apparatus can also include, in addition to hardware, code that creates an execution environment for the computer program in question, for example, code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, for example, an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer can include a processor for performing actions in accordance with instructions and one or more memory devices for storing instructions and data. Generally, a computer will also include, or be operatively coupled to receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, for example, EPROM, EEPROM, and flash memory devices; magnetic disks, for example, internal hard disks or removable disks;

magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, for example, a CRT (cathode ray tube) or LCD (liquid crystal display) monitor, for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component (e.g., such as a data server), or that includes a middleware component (e.g., an application server), or that includes a front-end component (e.g., a client computer having a graphical user interface or a Web browser through which a user can interact with an implementation of the subject matter described in this specification), or any combination of one or more such back-end, middleware, or front-end components. The components of the system can be interconnected by any form or medium of digital data communication (e.g., a communication network). Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any implementation of the present disclosure or of what may be claimed, but rather as descriptions of features specific to example implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A system comprising:
    a building monitoring hub comprising at least one processor;
    a sensor system associated with a building and being responsive to damage to the building, the sensor system comprising a plurality of cameras, the cameras arranged at different locations under a roof of the building and oriented to capture images of an underside of the roof, each camera being in electronic communication with the building monitoring hub; and
    a data store coupled to the at least one processor having instructions stored thereon which, when executed by at least one processor of the building monitoring hub, causes the building monitoring hub to perform operations comprising:
        obtaining, from the cameras at a first time, a first plurality of images of the underside of the roof;
        generating, using the first plurality of images, a first model of the roof in the building;
        triggering the cameras to capture a second plurality of images of the underside of the roof at a second time;
        generating, using the second plurality of images, a second model of the roof in the building;
        detecting damage to the roof by identifying changes in a shape of a at least a portion of the underside of the roof as indicated by a comparison of the second model with the first model; and
        in response to detecting the damage, automatically coordinating a repair for the damage.

2. The system of claim 1, wherein the operations comprise sending, for display on a user interface device, an alert indicating a location and extent of the damage to the building.

3. The system of claim 1, wherein automatically coordinating the repair for the damage comprises:
    identifying building repair services to repair the damage; and
    sending, for display on a user device, an alert indicating (1) a location and an extent of the damage, and (2) contact information for the identified building repair services.

4. The system of claim 1, further comprising a sensor network wherein sensors in the sensor network are attached to a building material of the building, and
    wherein the operations further comprise:
        receiving, from the sensor network, an indication of damage to the building;
        determining, based on the indication, a location and an extent of the damage to the building; and
        in response to determining the location and the extent of the damage, automatically coordinating the repair for the damage.

5. The system of claim 4, wherein the indication includes data indicating that the damage has been at least partially repaired by a self-healing material, wherein determining the location and the extent of the damage comprises determining a number of sensors from the sensor network that have been activated due to the damage, and wherein automatically coordinating the repair for the damage comprises causing the sensor network to activate a self-healing substance to, at least partially, repair the damage.

6. The system of claim 1, wherein the second plurality of images are obtained at a regular time interval from a time that the first plurality of images were obtained.

7. The system of claim 1, wherein the second plurality of images are obtained in response to receiving a user input to trigger capture of the images.

8. The system of claim 1, wherein the operations further comprise receiving user input indicating a request to perform a damage check on the roof, and wherein triggering the cameras to capture the second plurality of images is performed in response to receiving the user input.

9. The system of claim 1, the operations further comprise triggering the cameras to capture images of the underside of the roof at regular time intervals to check for damage, and wherein the second plurality of images are captured at one of the regular time intervals.

10. The system of claim 9, wherein the regular time intervals comprise intervals that are at least weekly.

11. The system of claim 1, wherein generating the first model of the roof in the building comprises generating, using the first plurality of images, a first three-dimensional model of the underside of the roof, and wherein generating, using the second plurality of images, the second model of the roof in the building comprises a first three-dimensional model of the underside of the roof.

12. The system of claim 11, wherein the cameras are installed within an attic of the building in an arrangement that permits the first plurality of images to be combined into the first three-dimensional model using three-dimensional construction techniques.

13. A computer-implemented method executed by at least one processor of a building monitoring hub, the method comprising:

receiving, by the building monitoring hub at a first time, a first plurality of images of an underside of a roof of a building, each image being received from a different one of a plurality of cameras that each are arranged at a different location under the roof of a building and oriented to capture images of the underside of the roof;

generating, using the first plurality of images, a first model of the roof in the building;

triggering, by the building monitoring hub, the cameras to capture a second plurality of images of the underside of the roof at a second time;

generating, using the second plurality of images, a second model of the roof in the building;

detecting, by the building monitoring hub, damage to the roof by identifying changes in a shape of at least a portion of the underside of the roof as indicated by a comparison of the second model with the first model; and in response to detecting the damage, automatically coordinating, by the building monitoring hub, a repair for the damage.

14. The method of claim 13, further comprising:

in response to detecting the damage, automatically coordinating, by the at least one processor, an overhead inspection of the building to obtain an overhead image of the building; and determining, from the overhead image, an extent of the damage.

15. The method of claim 14, wherein automatically coordinating the overhead inspection comprises coordinating a drone flight over the building and receiving the image from a drone.

16. The method of claim 14, wherein the overhead image is an infrared image.

17. The method of claim 16, wherein determining the extent of the damage comprises identifying, in the image, warm or cool air escaping from the building.

18. The method of claim 14, wherein determining the extent of the damage comprises evaluate contrasts and edges within the images to determine a size of a hole in a roof.

19. The method of claim 13, further comprising receiving user input indicating a request to perform a damage check on the roof, and wherein triggering the cameras to capture the second plurality of images is performed in response to receiving the user input.

20. A non-transitory computer readable storage medium storing instructions that, when executed by at least one processor of a building monitoring hub, cause the building monitoring hub to perform operations comprising:

receiving, by the building monitoring hub at a first time, a first plurality of images of an underside of a roof of a building, each image being received from a different one of a plurality of cameras that each are arranged at a different location under the roof of a building and oriented to capture images of the underside of the roof;

generating, using the first plurality of images, a first model of the roof in the building;

triggering, by the building monitoring hub, the cameras to capture a second plurality of images of the underside of the roof at a second time;

generating, using the second plurality of images, a second model of the roof in the building;

detecting, by the building monitoring hub, damage to the roof by identifying changes in a shape of at least a portion of the underside of the roof as indicated by a comparison of the second model with the first model; and in response to detecting the damage, automatically coordinating, by the building monitoring hub, a repair for the damage.

* * * * *